(12) United States Patent
Nightall

(10) Patent No.: US 6,782,833 B2
(45) Date of Patent: Aug. 31, 2004

(54) TRACKSIDE POWER DISTRIBUTION SYSTEMS

(75) Inventor: John Richard Nightall, West Midlands (GB)

(73) Assignee: Alston, Paris (FR)

( * ) Notice: Subject to any disclaimer, the term of this patent is extended or adjusted under 35 U.S.C. 154(b) by 0 days.

(21) Appl. No.: 10/018,760

(22) PCT Filed: Apr. 12, 2001

(86) PCT No.: PCT/GB01/01639

§ 371 (c)(1),
(2), (4) Date: Apr. 9, 2002

(87) PCT Pub. No.: WO01/79018

PCT Pub. Date: Oct. 25, 2001

(65) Prior Publication Data

US 2002/0134278 A1 Sep. 26, 2002

(30) Foreign Application Priority Data

Apr. 18, 2000 (GB) .............................. 0009424

(51) Int. Cl.$^7$ .............................................. B60M 1/10
(52) U.S. Cl. .......................................... 104/298; 191/2
(58) Field of Search ................................ 104/298, 165, 104/89; 191/2, 6

(56) References Cited

U.S. PATENT DOCUMENTS 4,202,273 A    5/1980    Matsui et al.
4,345,522 A  *  8/1982  Miyamoto et al. ............. 104/89
4,665,831 A  *  5/1987  Matsui et al. ................ 104/165

FOREIGN PATENT DOCUMENTS

| EP | 0 149 877 A1 | 1/1984 |
| GB | 1068719 | 5/1967 |
| GB | 2 180 705 A | 4/1987 |
| JP | 60191835 | 9/1985 |
| WO | WO 98/11645 | 3/1998 |

* cited by examiner

Primary Examiner—S. Joseph Morano
Assistant Examiner—Lars A. Olson
(74) Attorney, Agent, or Firm—Kirschstein, et al.

(57) ABSTRACT

A trackside power distribution apparatus includes overlapping feeders. A first signal supply unit has an input adapted to receive power from a first electrical power source and an output for supply of power to a feeder. A first portion of feeder is connected to the output of the first signal supply unit and extends alongside a track to a unit requiring power. A second signal supply unit has an input adapted to receive power from a second electrical power source and an output for supply of power to a feeder. A second portion of feeder is connected to the output of the second signal supply unit and extends alongside the track to the unit requiring power. A selection apparatus is also provided which selects which feeder portion is used to supply power to the unit. The provision of the two feeder portions improves the reliability of the apparatus in the event that one power source fails.

25 Claims, 6 Drawing Sheets

TRACKSIDE POWER DISTRIBUTION SYSTEMS

This invention relates to improvements in trackside power distribution systems for railways.

All railway systems include units which are located along the track and which need power either to monitor or control the use of the track. These units include control equipment, which controls the signals spaced at intervals along the track. The signals alert the driver of a train as to whether or not a train can proceed or must stop. Also, where a track branches, points are provided. To change this point automatically, for example using an electric motor, a source of electrical power is needed.

Furthermore many railways include some form of automatic train detection system. This typically involves providing sensors at intervals along the track which monitor sections, or zones, of track. The sensors detect the presence of a train on the tracks. Again, these also require a source of power.

In the past, trackside power distribution has been achieved by passing a low voltage, usually 650 volts, along a copper or aluminium conductor that extends from a source of power known as a signal supply unit to the various loads requiring power (such as control circuits and signals, points motors, train detection systems). A single two-core cable is provided, usually having an aluminium core cable. This may run along the track for several kilometers from the power source and is usually located within a concrete channel to protect it against damage. The various loads draw power from one core of the cable and return it to the source along the other. They are attached to the cable through take off spurs. The more loads that are connected to a cable, the thicker the cable must be. For this reason, the length of cable is limited. To serve a large railway network, several/sources of power are provided along the track, so that between them the whole of the track is supplied with power.

The 650 volt supply is isolated from earth in accordance with provisions in current wiring regulations. The regulations allow the power to remain connected in the event of the conductors becoming connected to earth.

The use of the single feeder cable in the prior art presents several problems. The first, and most important problem is that the reliability of the system is entirely dependent on the integrity of the cable. The cable is often attacked by vandals, or chewed by rodents. If the cable is broken in this way it will prevent the flow of power from the source to any loads downstream of the break.

A further problem arises due to the need to provide high levels of reliability for the signal supply unit. Obviously, it is critical for the safety of a railway that power to signals is maintained even if a fault at the supply occurs. Even for an overspecified signal supply unit a failure of the electricity distribution network to which it is connected will cut-off the supply to the feeder cable.

At present, an acceptable level of reliability is achieved by providing a large back-up generator at the end of the feeder cable nearest the source of power. If the power source fails the generator is adapted to start automatically. The provision of such a large generator is, however, undesirable as it is both costly to maintain and also expensive to install. Generators must be lubricated frequently to ensure they remain reliable (especially when they are normally dormant) and containment for the lubricant must be provided.

Figure 1:
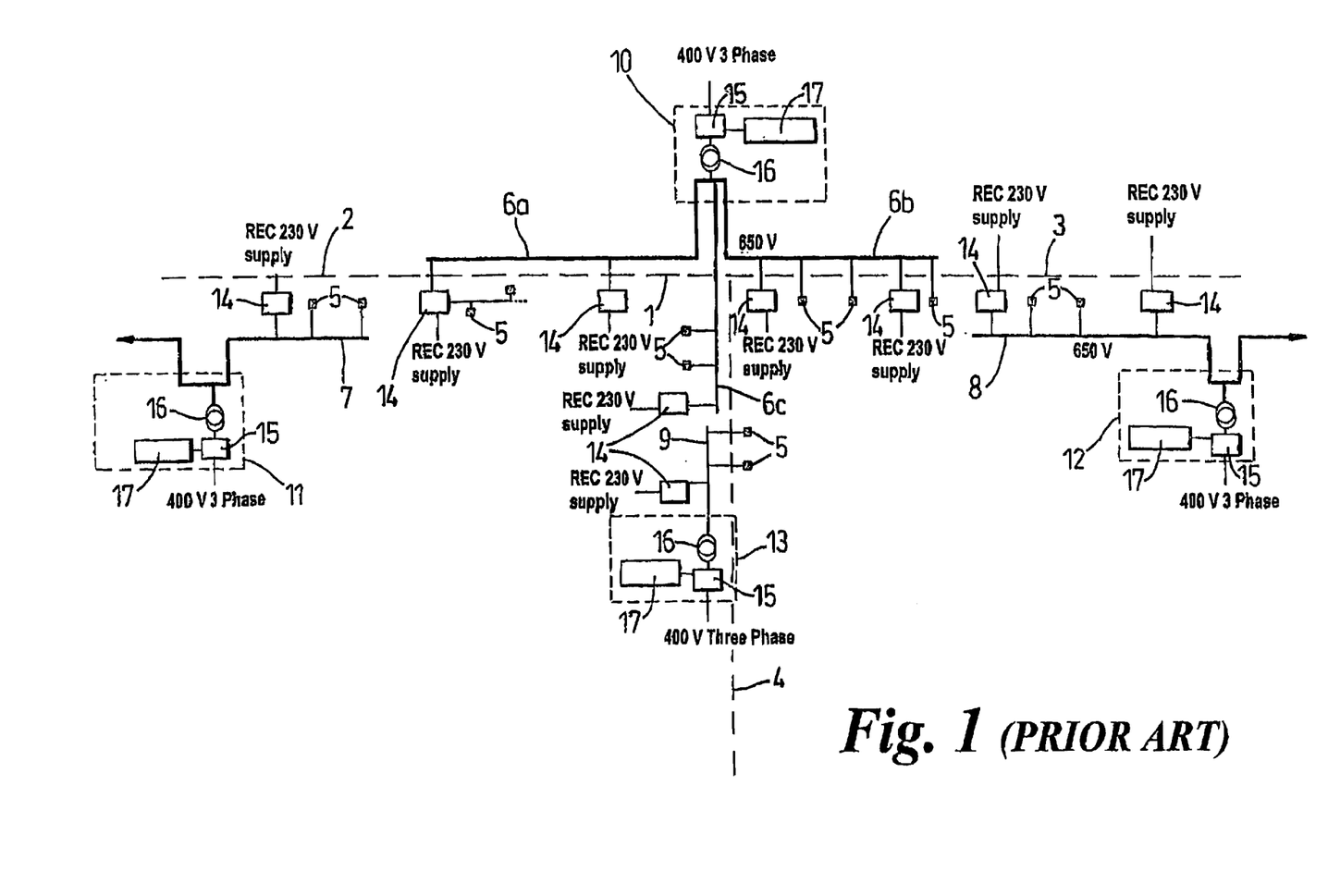
FIG. 1 is a schematic of a prior art railway trackside power distribution system for signalling.

A representative example of a prior art trackside signal power distribution system for railways is illustrated schematically in FIG. 1 of the accompanying drawings.

The portion of track supplied by the system in FIG. 1, shown in dashed line, is divided into four sections 1,2,3,4 to form a T-shape. One section 1 defines the centre of the track and extends three ways from the centre of the T. The remaining three sections 2,3,4 define the extremities of track.

Each section 1,2,3,4 is provided with various units requiring power, in this case small location cases 5 located along the section. The cases located long the centre section of track 1 receive power from one of the three feeder cables 6a,6b,6c radiating from a centrally located power supply 10. The other units 5 receive power supplied along a respective feeder cable 7,8,9 associated with a respective supply unit 11,12,13. Thus, four signal supply units and six feeders are provided in this example. Of these, one supply unit has three feeders 6a,6b,6c extending from it such that the supply is effectively located at the centre of a feeder rather than at the ends. The others have one feeder and are therefore located at the end of a section. The choice of location depends largely on the availability of a suitable tap into a regional electricity distribution network and the topoplogy of the signalling system.

Each feeder 6a,6b,6c,7,8 and 9 extends for approximately half of the distance between signal supply units and each piece of trackside equipment, 5 receives power from the signal feeder associated with that section.

As illustrated, the trackside equipment for each section includes at least two location units 5. Also shown is the presence of at least one larger casing in the form of a relocatable equipment building 14 on each section. The relocatable equipment buildings 14 contain an air-conditioning unit to keep the equipment cool. Power for this is taken from a separate tap into an adjacent regional distribution network, although power for the contents and equipment within the relocated equipment building are taken from the feeders.

Each signal supply unit comprises a change over switch 15 that connects the feeder, through an isolation transformer 16, to the regional electricity distribution network at that point. It is therefore the responsibility of the regional electricity company running the network to supply power to the feeders through the signal supply unit.

In the event of a loss of power from the distribution network, the changeover switch may be operated to isolate the transformer from the network and connect it to a back-up generator 17. This provides an alternative source of power in the event of a failure.

A problem with such a system is that a fault at any one signal supply unit can cause a complete loss of power to its associated feeder. This is unacceptable for reliability and safety reasons. Another problem occurs if the feeder is severed (for instance by a rodent chewing on the cable or vandalism), resulting in all units downstream of the point at which the cable is severed losing power. The reliability of the back-up generator is also of doubt, depending to a large extent on the quality of maintenance it receives.

An object of the present invention is to ameliorate some of the problems of the prior art systems, and to provide a more reliable trackside power distribution system for railways.

According to a first aspect, the invention provides a trackside power distribution apparatus comprising:

a first signal supply unit having an input adapted to receive power from a first electrical power source and an output for supply of power to a feeder;

a first portion of feeder connected to the output of the first signal supply unit and extending alongside the track to a unit requiring power, a second signal supply unit having an input adapted to receive power from a second electrical power source and an output for supply of power to a feeder; and a second portion of feeder connected to the output of the second signal supply unit and extending alongside the track to the said unit requiring power.

The apparatus may further include a selection apparatus adapted to select which feeder portion is used to supply power to the unit.

Units requiring power within the scope of the invention include location cases which house control equipment, for example to control signal lights along the track. Several such location cases may be provided which individually draw power from a feeder portion, or a group of several cases may draw power from a feeder through an intermediate unit. Larger loads such as relocatable equipment buildings containing more equipment than can be housed in a location case may also be provided.

The invention thus provides for an apparatus in which a load can receive power from either one of a first and second signal supply unit along either a first or second feeder. Compared with prior systems in which only one source of power is provided a considerable improvement in reliability is achieved.

The first and second electrical power sources preferably comprise different power sources, such as two different regional electricity distribution networks. This provides increased reliability in the event that one network fails.

Alternatively, one or both power sources may comprise a catenary supply or a generator. A combination of regional supply networks, catenary supplies or generators may be provided.

The first portion of feeder and the second portion of feeder are preferably portions of separate feeders which extend from their respective supply units.

Where more than one unit requiring power is located along the track, these units may each be connected to both the first and second feeders. In this case, the feeders will overlap. It will, of course, be understood that by overlap we mean that the feeders run along an overlapping portion of the track, and not necessarily that they touch one another but run alongside.

The signal supply units are preferably located at different positions along the track with the first and second portions of feeder extending along the tracks between the supply units.

In an alternative, the first and second portions of feeder may comprise portions of a single cable interconnecting the first and second signal supply units. For example, if a unit requiring power is located midway between two supply units on the track, a single feeder may connect both supply units to the unit requiring power. One half of the feeder will then define the first portion with the other half defining the second portion. This again differs from the prior art in which only a single signal supply unit is associated with each portion of track.

A length of track may be divided into sections. In that case, a pair of signal supply units and their first and second portions of feeder may supply each section. Alternatively, signal supply units may be shared between sections, with one supply unit sharing a first feeder portion of two sections.

Each signal supply unit may comprise an uninterruptable power supply connected in series with a transformer between the input from the electrical distribution network and the output to the respective feeder.

The uninterrupted power supply may comprise a battery and an AC-DC-AC converter. The battery may comprise a capacitor or a capacitor bank.

The or each signal supply unit may produce an output for supply to a feeder portion comprising an alternating (ac) current with a potential of 650 volts. Other voltages may be provided depending on local and international railway regulations.

A selection apparatus may be provided which is adapted to select which feeder portion is used to supply power to a load. A selection apparatus may be provided for each load. Alternatively, a single selection apparatus may be provided which is associated with a plurality of loads. The selection apparatus preferably performs the selection automatically, i.e. independent of human intervention.

The selection apparatus, which is adapted to select which feeder is used to supply power to a unit at any instant may be located at the unit requiring power or at one or more of the signal supply units or may be distributed between the two.

The selection apparatus, when located at the unit requiring power, may include switching means adapted to alternatively connect the unit to the first portion of feeder and isolate the unit from the second portion of feeder when in a first position, and connect the unit to the second portion of feeder and isolate the unit from the first portion of feeder when in a second position.

The selection apparatus may comprise a solid state switch. In this case, instead of connecting/isolating a feeder from the load the switch may simply vary the resistance between the feeder and the load, i.e. from approximately zero to almost infinite resistance. Power will then be preferentially drawn only through the low resistance connection.

The selection apparatus may be adapted to change the position of the switching means automatically in response to a measurement of voltage at the feeders or in response to a signal issued from one or more of the signal supply units.

If both signal supply units are functioning normally, and both feeders are undamaged, either one of the feeders could supply power to the unit. The selection apparatus can choose either feeder. Tis may be either an arbitrary selection or the unit may default to one of the feeders.

Alternatively, the selection apparatus may be adapted to draw a DC load from both supplies simultaneously, i.e., sharing the load between the feeders.

The switching means may be located adjacent the unit to be powered, such as a signal set. Alternatively, the switching means may be integrated into the unit to be powered. It may be located within a shielded enclosure.

The unit to be powered may be connected to the first and second portions of feeder through one or more isolating transformers. These may comprise step-down transformers so that the load receives a voltage lower than the voltage on the feeder. The transformers are preferably located outside of the enclosure. The inside of the enclosure is therefore only exposed to the lower voltage output of the stepdown transformer, and is completely isolated from the feeder voltage.

One or more additional isolating transformers may be located between the switching means and the unit to be powered, such as a signal set. These additional isolating transformers may be located within the shielded enclosure.

A bypass switching means may be provided in addition to the selection apparatus. This may be adapted to permit current to flow directly from the output of one of the step-down isolation transformers to a load without flowing through the selection apparatus. It may be manually operated. It may be located within the shielded enclosure.

The selection apparatus may further include, a voltage slew rate limiter that limits the rate of change of output voltage at the output take-off node to below a threshold value. For example, rapid reversals in dv/dt from positive to negative values can prevent fast voltage changes occurring on switch over that could cause maloperation of the equipment. The slew rate limiter may comprise a filter.

In the case where the first and second portions of feeder comprise parts of a single feeder, the selection units may be adapted to isolate the output of one or both of the signal supply units from their respective feeder(s). The selection apparatus may be adapted to either physically isolate one of the signal supply units from the feeder (so that power is only supplied by one signal supply unit), or may control the operation of the signals supply units. This may, for example, comprise switching the uninterrupted power supply on or off as required. In this way, the selection apparatus ensures that only one signal supply unit powers the feeder at any instant The units to be powered can therefore only draw power from one feeder. The selection apparatus may default to connecting one signal supply unit to the feeder in preference to the other when both are operating correctly.

Where a single feeder is provided, two types of fault can occur which may result in loss of power to a unit drawing power. The first is a failure of the signal supply unit (or its distribution network) that is connected to supply power to the feeder. This is most commonly caused by a fault in the regional electricity company supply network. The second fault is a break of the feeder between the signal supply unit and the unit drawing power.

The selection apparatus may be adapted to automatically connect a signal supply unit to the feeder in the event that a fault at the other signal supply unit occurs.

At least a first one of the signal supply units way include means for producing a pilot signal, and a transmission means for sending the pilot signal along the feeder to the other signal supply unit, and the other supply unit includes a detection means for detecting the pilot signal supplied by the other signal supply unit. This allows the operation of the first At or integrity of the feeder to be detected by the second unit.

It is preferred that both of the first and second supply units include a pilot signal generator and a detector.

Many different suitable pilot signals are envisaged. A periodic signal such as a sinewave is preferred.

The first and second signal supply units preferably produce different pilot tone signals. They may, for example, have different frequencies, Thus, were the first and second feeder portions comprise parts of a single feeder it is possible for the detectors to discriminate between the pilot tones.

If the detection means of a first signal supply unit detects the presence of the pilot signal from the other unit and the presence of a load voltage on the feeder supplied by that other supply unit then the selection unit may maintain the present operational status.

If the pilot tone remains but the load voltage drops out, this indicates that the other supply unit has failed and so the selection apparatus may be adapted to automatically start supply power from the first signal supply unit to the feeder. In this case, since the pilot tone is present it is known that a break in the feeder has not occurred.

In the event that the presence of the load voltage from the other signal supply unit is not detected and a pilot tone is not detected, it may not connect its unit to the feeder but instead indicate a fault has been detected, for instance by raising a flag.

In a further refinement, in particular where the first and second portions of feeder comprise portions of two different feeders, the system may further includes a phase alignment means adapted to maintain the signals supplied to each feeder portion from first and second signal supply units roughly in phase.

The phase alignment means may comprise a measurement means that is adapted to measure the phase of the signal supplied by a first one of the signal supply units and a correction means that is adapted to adjust the phase of the second one of the signal supply units to match that of the first signal supply unit.

A measurement of the signal on one feeder may be obtained by the signal supply unit supplying the other feeder. The adjustment means may therefore bring the phase on the feeder into line with the other signal. Thus, one signal supply unit acts as a master whilst the other acts as a slave unit.

In an alternative, both units may include similar or identical phase alignment units.

At least one but preferably all of the feeders may comprise a cable comprising at least two discrete conductors. One conductor may be arranged concentrically around the other conductor. If one cable breaks, for instance because it is chewed by a rodent, only the outside conductor will be damaged. An insulating sheath may be provided between the two cables In this case, once through the other cable a further layer of protection is still in place.

If a second fault occurs before the first is repaired then the damage will now occur to the same cable as the first. This will not cause a cable failure due to an electrical short circuit through earth as the inner cable is protected by the insulating sheath.

At least one, and preferably all, of the feeders may decrease in cross sectional area along their length from the end nearest the signal supply unit to the other end as a function of the current that it will carry in operation. The cross-sectional area of the able along its length can be optimised by calculating the peak current that the cable must carry. This will depend not only on the peak current that can be drawn by the units supplied by the cable, but also where they connect to the feeder and the sequences in which they draw power as there may be certain limited combinations in which units draw power over time To further enhance reliability it is preferred that the signal supply units are located at different, spaced, locations along the line. The two signal supply units may also, preferably, draw power from different distribution networks, or different generators, or a combination.

There will now be described, by way of example only, two embodiments of the present invention with reference to the accompanying drawings of which.

Figure 2:
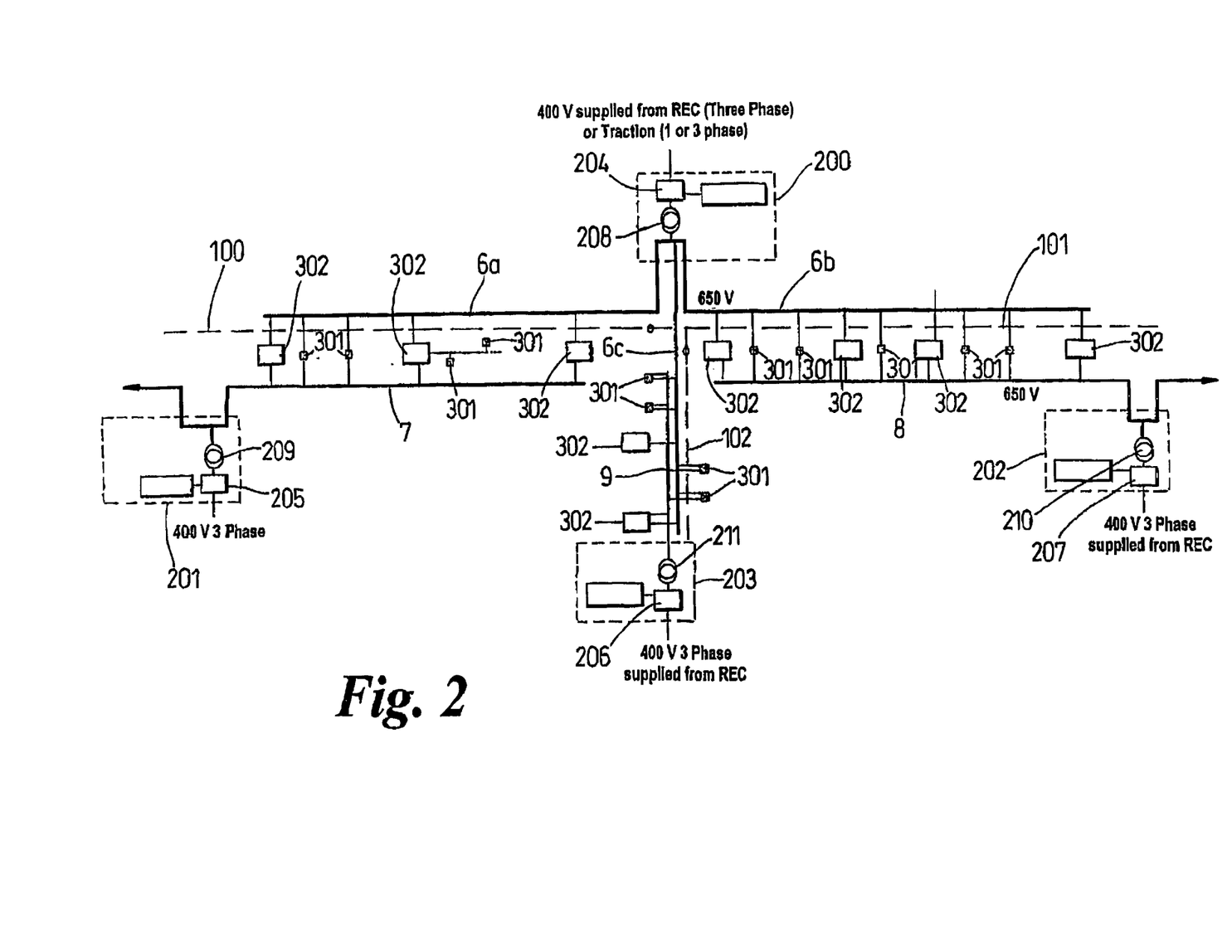
FIG. 2 is a schematic drawing of a railway trackside power distribution system for signalling according to one aspect of the present invention.
Figure 3:
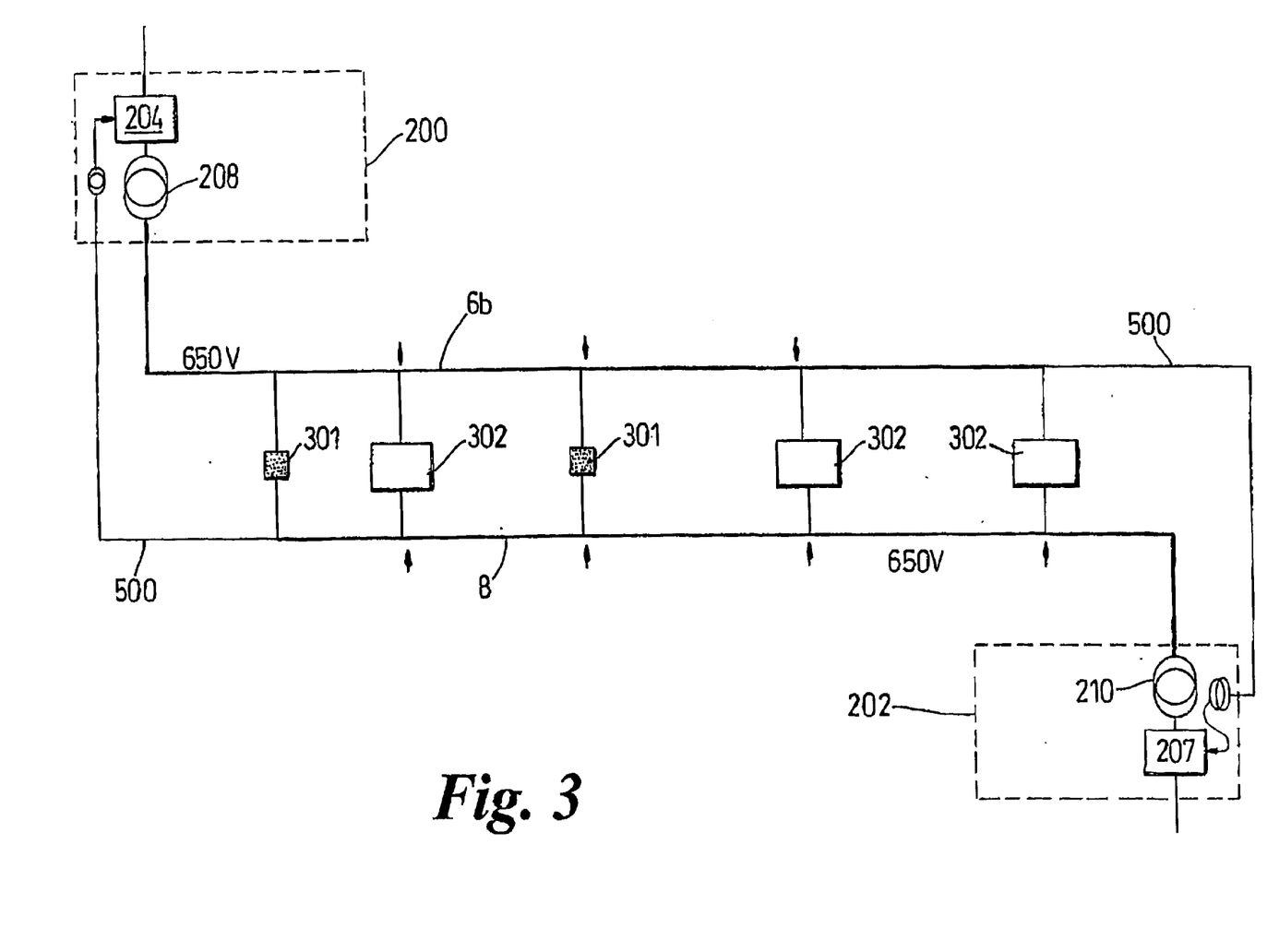
FIG. 3 is an alternative schematic illustrating the connection between the two signal supply units of the system of FIG. 2 which permits master/slave operation of the signal supply units.
Figure 4:
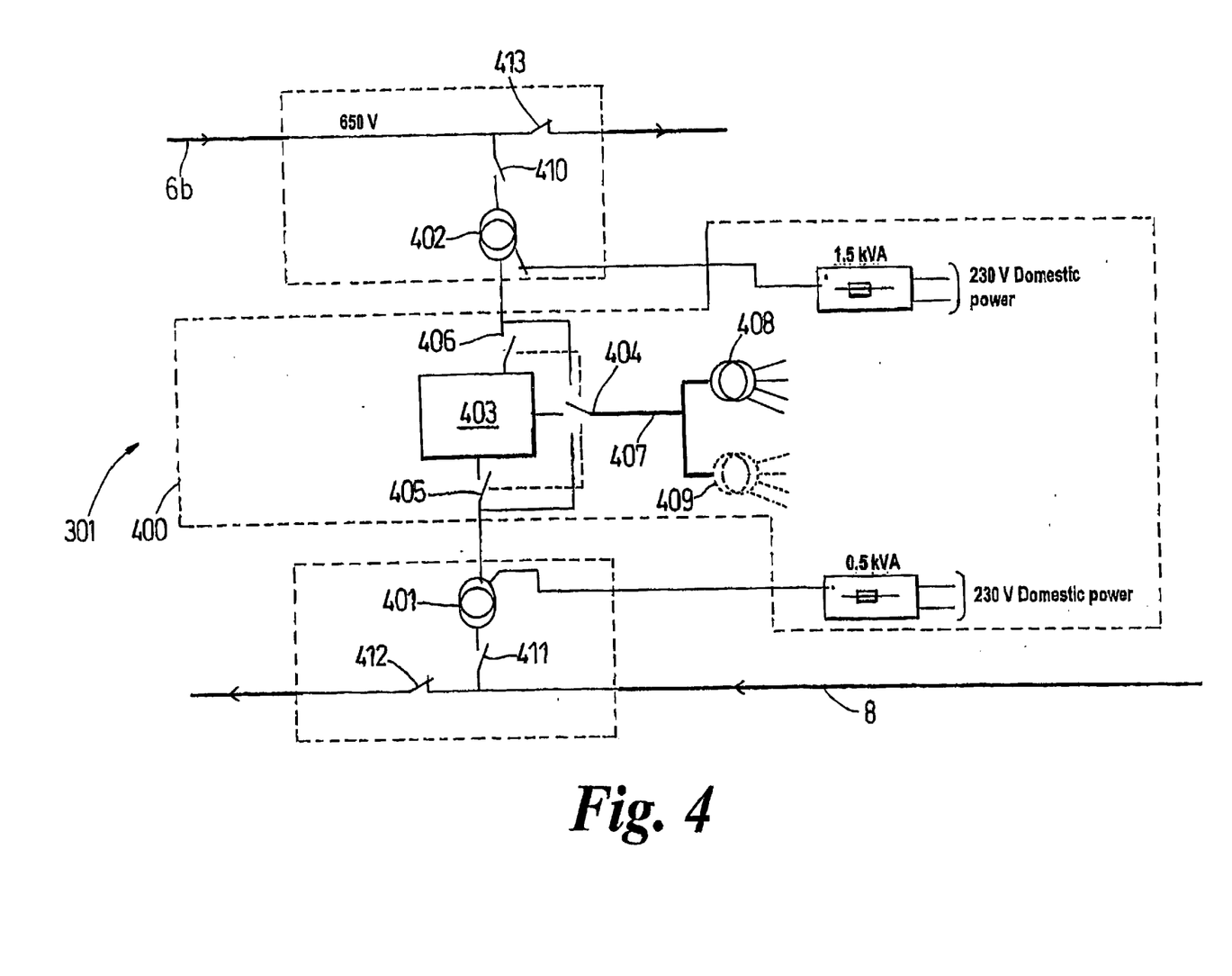
FIG. 4 is an enlarged schematic illustrating the major functional element defining the signal equipment enclosures illustrated in FIG. 2 and FIG. 3 as well as their relative location with respect to the feeders.

A first embodiment of a trackside power distribution system for signalling is illustrated in FIGS. 2 to 4 of the accompanying drawings. In order to provide a simple comparison with a prior art system, the points at which power can be taken from the regional electricity companies are assumed to be the same as those illustrated in FIG. 1 (prior art) in the track is assumed to have the same layout.

Whereas in the prior art the power distribution for the track was divided into six sections, each served by a single feeder cable extending along the track from a point at which power can be taken from the regional electricity company, the system of FIGS. 2 to 4 ensures that for any piece of equipment 5 located along the track a power feed can be taken from at least two different points. This is achieved by overlapping the feeders 6a,6b,6c,7,8,9 from each power supply point, The track is therefore only divided into three sections. One section corresponds to sections 6a and 7 of the prior art, another to sections 6b and 8 of the prior art and the third to sections 6c and 9. Two types of unit are located along the tracks:—small location cases 301 and larger cases 302 that replace the location cases 5 and relocatable equipment buildings 14 of the prior art.

The track is divided into three sections 100,101,102. The point at the centre of the three sections 100, which is T shaped, is provided with a signal supply unit 200 which provides a connection between the 400 volts regional electricity company supply and three feeder cables. For each of the points at the ends of the track section a respective signal supply unit 201,202,203 is provided. Each of these units connects the 400 volts distribution network voltage to an associated feeder. In this respect, the system is the same-as that known in the prior art.

A significant structural difference between the present invention as illustrated in the embodiment of FIGS. 2 to 4 and the prior art is that each of the feeders 6a, 6b, 6c,7,8 and 9 from each signal supply unit 200,201,202,203 extend further along the track to overlap a feeder from the other end of a track section. Additionally, power to the location cases 301 spaced along the track, and to the larger equipment buildings 302 which are used to house either train location equipment, as well as controls and power for the signals, can be supplied from either one of the overlapping feeders under the control of a selection unit (not shown in FIG. 2) located at each unit along the track.

To minimise the additional cost of extending the feeder cables 6a, 6b,6c,7,8,9 which carry a 650 volt alternating supply, the cross-sectional area of the cable along its length is tailored to the current it is expected to carry. In practice, this results in the feeder tapering in size away from the signal supply unit.

It is important to note that the duplication of feeders 6,7,8,9 provides a considerable improvement in reliability. To maximise this improvement, the power supply for each of the signal supply units for the overlapping feeders is taken from different regional electricity company networks. In such a case, even if one network is to fail, it is highly unlikely that the other network will also have failed and so continuity of supply can be maintained to any unit 5.

The signal supply units 200,201,202,203 also differ from those of the prior art and are both simpler and less expensive.

Because only a single feeder was used in the prior art, to ensure continuity of supply in the event of a power supply failure (i.e. fault on the network) a back up generator was provided. A change over switch facilitates connection of the feeder to either the network supply or the generator supply.

In the embodiment of FIGS. 2 to 4 each signal supply unit 200,201,202,203 includes an uninterruptable power supply (UPS) 204,205,206,207. This is connected in series with an isolating transformer 208,209,210,211 between the network supply and the associated feeder 6,7,8,9. The UPS is essentially an AC-DC-AC converter that produces an output voltage at a frequency determined by a crystal which forms part of the circuit. As such, the output frequency is substantially independent of the network frequency provided by the regional electricity company. In the event of a network failure, a back-up battery (not shown) is electrically connected to the DC stage of the UPS maintains an output for a predetermined period.

The UPS 204,205,206,207 cannot maintain a back-up supply indefinitely. However, due to the additional reliability provided by the overlapping feeders 6,7,8,9 an acceptable back-up time can be achieved from an affordable battery size. The time before it runs out need only be sufficient for a change-over of feeder supply to be made rather than repair of the distribution network.

In normal operation, two feeders can supply power to any one piece of equipment located along the track. This equipment, as shown may comprise a location case 301 that connects to the feeders directly or perhaps a group of cases 301 that share a common connection to the feeder portions. The equipment associated with each case 301 (or equipment building 302) is provided with a stepped down voltage that is fed to a selection apparatus 403 which is housed, at least partially, within the enclosure 301 (or 302) located along the line. The signals draw power from only one feeder 6,7,8 or 9 under the control of the selection apparatus 403. This is shown in more detail in FIG. 4 of the accompanying drawings.

FIG. 4 shows two sections of feeder 6b,8, each connected to a respective signal supply unit 200,202 located at spaced locations along the track. Each feeder 6b,8 is supplied with a 650 volt signal and supplies power to a location case 301.

Each feeder 6b,8 is connected to a step-down transformer 401,402 which is located outside of the location case 301. Each transformer 401,402 provides a 230 volt output and a separate, 110 volt output which is supplied to the selection apparatus 403 located within the location case 301. Thus, ignoring voltage drop along the feeders, and differences in the supply network voltages, the selection apparatus 403 normally receives two identical 110 volt inputs. If the voltage drop is taken into account then the voltage at the input to the selection apparatus may be different depending on the load current drawn and the length and properties of the feeder portions.

The selection apparatus 403 is located within a shielded enclosure 400 of the location case (or equipment building) 301 and the step-down transformers 401,402 are located outside of the enclosure 400. This ensures that there are no voltages greater than 110 volts present within the enclosure 400.

The selection apparatus 403 comprises an electronic switch in the form of a group of triacs. The triacs are arranged such that in a first position a high resistance path is provided between the 110 volt supply from the first isolating transformer 401 and the output of the selection apparatus 403. At the same time a low resistance path is provided between the 110 volt output of the second isolating transformer 402 and the output of the selection apparatus. In a second position of the electronic switch the low and high resistance paths are reversed.

The output of the selection apparatus is connected to one input pole of a three input-one output bypass switch 404. One of the refraining inputs of the bypass switch is connected through a first auxiliary bypass switch 405 to the secondary of the first isolating transformer 401. The final input connects through a second auxiliary bypass switch 406 to the secondary of the second isolating transformer 402.

All three bypass switches are manually operated are connected by a cam and can be manually operated for movement between one of three positions.

In its normal position, the two auxiliary bypass switches connect both the isolating transformers to the electronic switch 403 whilst the main bypass switch connects the output of the selection apparatus to an output node 407 on an upstream side of the main bypass switch.

In the remaining two positions the main bypass switch may be configured to directly connect either one of the isolating transformers to the output node 407 through one of the auxiliary bypass switches whilst isolating the selection electronic switch. This allows complete isolation in the event of a fault occurring.

The output node 407 of the main bypass switch 404 is connected to the load which in the example of FIG. 4 comprises two isolating transformers 408,409 that drive control circuitry (not shown) provided within the shielded enclosure. Each transformer has one input and four identical output windings. One secondary winding feeds the control circuitry for the signal light set. The others are used to supply power to other adjacent equipment such as points motors.

The selection apparatus 403 is adapted to ensure that current is obtained from a feeder 6b,8 which is supplied by a functioning distribution network. For example, if the switch is positioned so that current is drawn from the first feeder 6b and the network supply to this feeder fails, the position of the switches will be changed to draw current from the second feeder 8.

Also as shown in FIG. 4, two isolating switches 410,411 allow the isolating transformers 401, 402 to be switched out of the feeders for repair or replacement. Two further switches 412,413, each provided in series in a respective feeder, allow the feeder to be broken adjacent the load. This is advantageous in the event that an earth fault occurs on a feeder. By opening the isolating switches on either side of the fault the system can be kept operational until a repair is made.

In normal operation, both feeders 6,8 will be available to supply current In this case the selection apparatus preferentially selects one feeder over the other in dependence upon predetermined parameters, such as the distance from the unit to the supply for a feeder. The closest supply may form the default feeder.

A potential problem with the overlapping feeder system may arise if the alternative voltages supplied by each feeder are unsynchronised and are out of phase. In this case, switching from one feeder 6 to the other feeder 8 may cause a sudden increase (or decrease) in voltage supplied to the output of the selection apparatus, This may cause the electronic control units or the signal units to malfunction if the rate of change of voltage is too great.

Figure 6A:
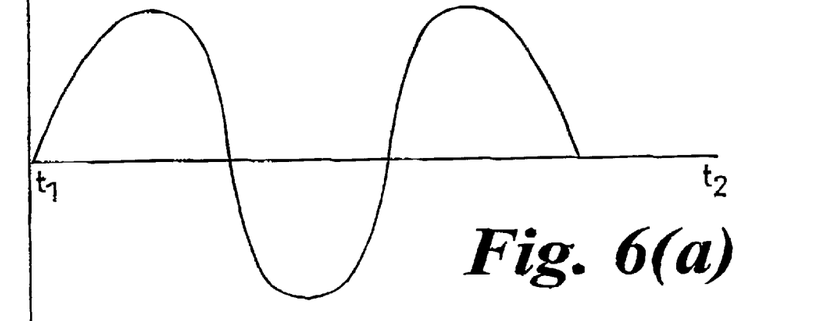
FIGS. 6(a), (b), (c) and (d) are waveforms that may occur if the voltage on each of the feeders is 180° out of phase.
Figure 6B:
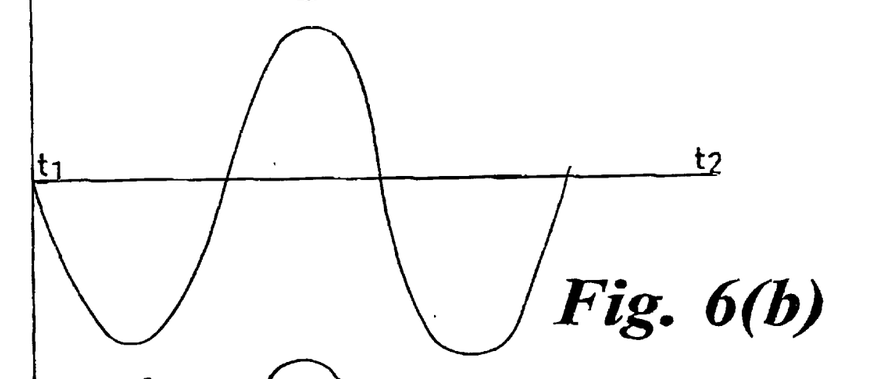
Figures 6C, 6D:
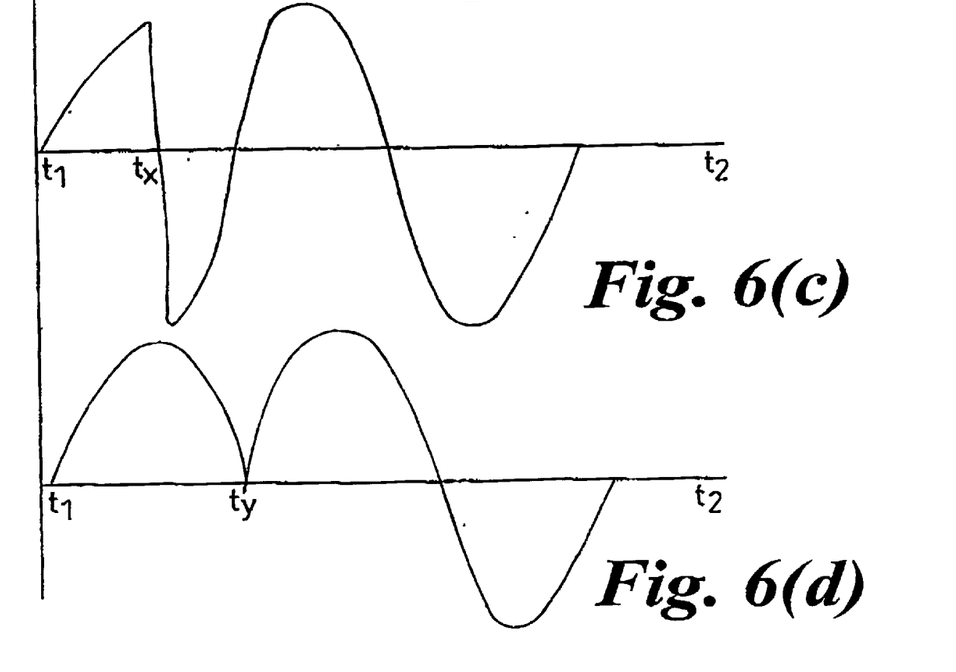

FIG. 6 illustrates the possible change in output signal that may occur if the voltage of each of the feeders is 180 degrees out of phase. The voltage on each feeder is shown in FIGS. 6(*a*) and 6(*b*) over a time $t_1$ to $t_2$. The output voltage for a change from one feeder to the other occurring at time $t_x$ is shown in FIG. 6(*c*). For the same change occurring at the $t_y$ the output is shown in FIG. 6(*d*). Obviously a change at time $t_y$ produces a very rapid rate of change of voltage. In some cases this could cause a condition in a control unit that requires a reset of the signals.

To prevent such a rapid change, the output of the selection unit passes through a filter which limits the rate of change to below a threshold "safe" level.

In order to help reduce the occurrence of excessive voltage changes on changeover, the two UPS units associated with a pair of operating feeders are synchronised so that the voltage on the first feeder is in phase with the voltage on the second feeder.

To keep the voltage on the two feeders in phase, an electrical connection 501,502 is taken from the end of a feeder 8,6b most distant from its signal supply unit 202,200. The connection 501,502 is connected to a control unit 204,207 provided within the signal supply unit of the other feeder. This is shown in FIG. 3 as an input to the uninterruptable power supply 204,207. Only one signal supply unit 200 requires such a connection and acts as the "slave" unit although in the example shown both have a connection.

On start up, one unit assumes a role as a slave and the other a role as a master, The slave unit automatically adjusts the phase of the output voltage from the UPS until it is in phase with the tapped voltage on the other feeder of the master. The master signal supply unit 202 therefore determines the phase of the voltage applied to both feeders.

Figure 5:
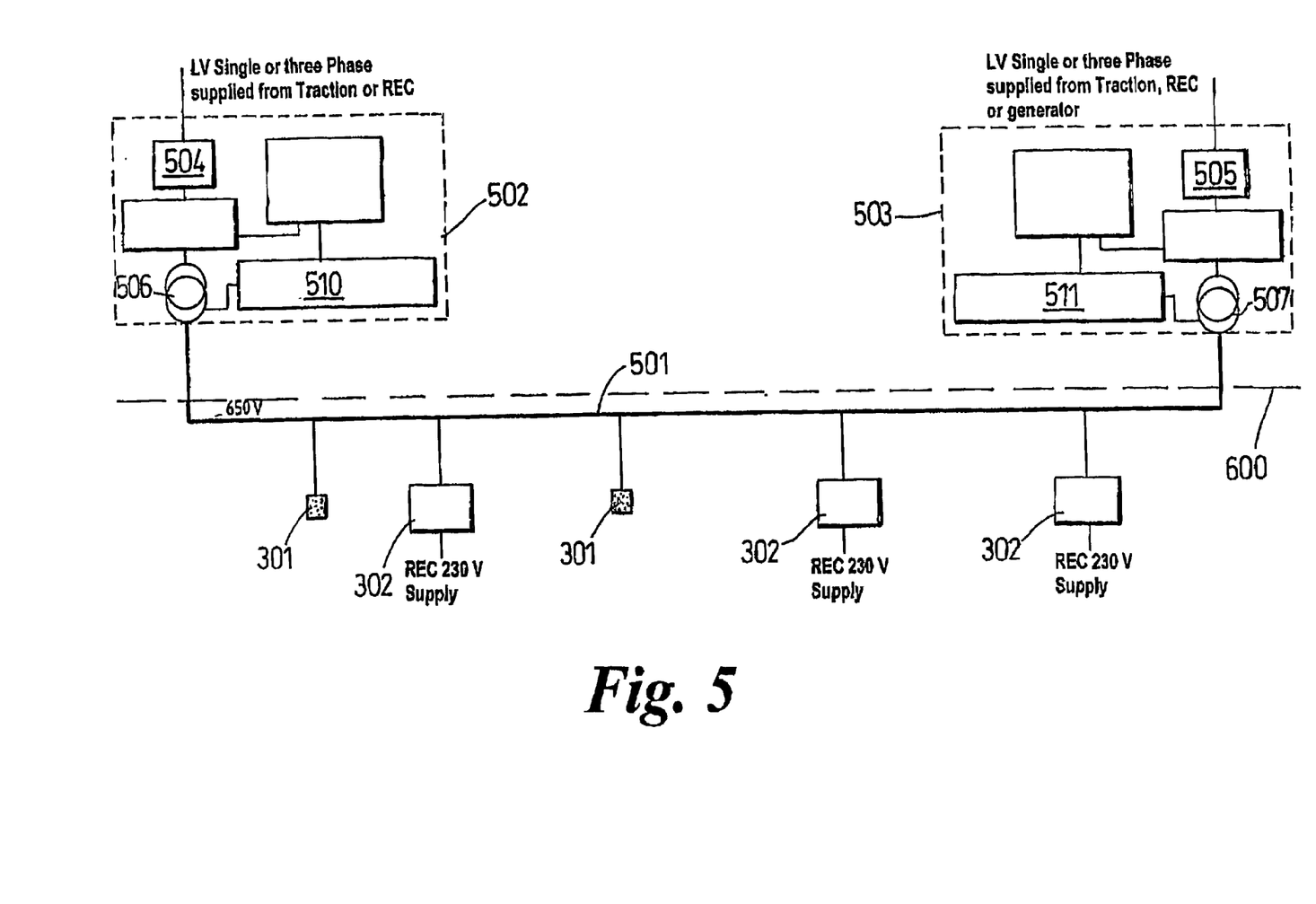
FIG. 5 a schematic drawing of an alternative railway trackside power distribution system for signalling in accordance with a second aspect of the present invention.

An alternative system is illustrated in FIG. 5 of the accompanying drawings. The system shown supplies power to units 5 located along a single length of track 600. In this system, a single (non-overlapping) feeder 601 is used, such as that already installed in the prior art systems. However, rather than having a signal supply unit at one end of the feeder only, a signal supply unit 602, 603 is provided at each end. This system is therefore suitable for use as an upgrade of a prior art system where the existing single cables can be used. The presence of the dual signal supply units 602, 603 offers improved reliability and allows a section of feeder to be isolated for a repair.

The signal supply units 602,603 are similar to those of the embodiment of FIGS. 2 to 5 in that they include an uninterruptable power supply 604,605 that functions as an AC-DC-AC generator that feeds through a transformer 606,607 to supply a voltage to the feeder.

Each signal supply unit 602,603 further includes a control unit 608,609 that permits each unit to act as either a master or a slave unit depending on line conditions and the function of the distribution networks.

Each unit also includes a tone generator unit 610,611 for producing a low frequency pilot tones It should be noted that the tone generator unit in each of the two signal supply units produces a different tone for supply to the feeder. Each unit also includes, as part of its control unit, a detector which detects the presence of the generated tones on the feeder and the presence of the 650 volt supply. The tones are supplied to the feeder 501 irrespective of the presence of a functioning supply from the network, i.e. by power from a back-up battery (not shown).

In practice, one signal supply unit 602 will detect the presence of the tone fed onto the feeder by the other unit 603, and vice versa This indicates that there is no break on the feeder. Assuming both distribution networks are functioning normally, either supply unit 602,603 could be used to provide voltage to the feeder. One unit 602 is arbitrarily selected to perform this function and form the "master". The other unit 603 supplies no power but measures the presence of the pilot tone from the master unit 602.

If the distribution network supplying the feeder from the master unit 602 fails, initially the UPS of that unit will provide back-up power and the voltage will still be supplied by the master. The slave unit still detects the no plot tone. Once the UPS battery runs too low, the supply will shut down.

The slave unit will continue to detect the presence of the pilot tone from the master unit but will also detect a drop in line voltage. This is used as a signal for the slave unit to switch to become the master. It will then start to feed a supply voltage to the feeder 601.

A different situation occurs if the slave unit 603 detects a loss of power on the line accompanied by a loss of the pilot tone. This indicates a fault on the feeder line, such as a ruptured or a short circuit feeder cable. In this instance, the slave unit 603 does not become the master and does not supply power but instead provides a fault indication.

In the event of a whole system loss, where both units have been shut down, then one signal supply unit will switch on in preference to the other and initially generate a pilot tone but not supply a voltage supply to the feeder. The other supply unit also applies a pilot tone in response which is detected by the first unit and used as a signal to start to apply a voltage supply. This situation can be dealt with adequately by providing a hierarchy, whereby one unit is always the master in such a case. In a simple arrangement, one unit may include a longer delay between switch on and generation of the pilot tone, or between detecting a pilot tone and supplying power, or both. This prevents both units restarting at the same time.

What is claimed is:

1. A trackside power distribution system, comprising:
   a) a first signal supply unit having an input for receiving power from a first electrical power source, and an output for supplying power;
   b) a first feeder portion connected to the output of the first signal supply unit and extending alongside a track to a unit requiring power;
   c) a second signal supply unit having an input for receiving power from a second electrical power source, and an output for supplying power;
   d) a second feeder portion connected to the output of the second signal supply unit and extending alongside the track to said unit requiring power;
   e) a selection apparatus for selecting which feeder portion is used for supplying power to said unit requiring power; and
   f) each signal supply unit comprising an uninterruptible power supply connected in series with a transformer between the respective input from the respective electrical power source and the respective output to the respective feeder portion.

2. The trackside power distribution system according to claim 1, in which the uninterruptible power supply comprises a battery and an AC-DC-AC converter.

3. A trackside power distribution system, comprising:
   a) a first signal supply unit having an input for receiving power from a first electrical power source, and an output for supplying power;
   b) a first feeder portion connected to the output of the first signal supply unit and extending alongside a track to a unit requiring power;
   c) a second signal supply unit having an input for receiving power from a second electrical power source, and an output for supplying power;
   d) a second feeder portion connected to the output of the second signal supply unit and extending alongside the track to said unit requiring power;
   e) a selection apparatus for selecting which feeder portion is used for supplying power to said unit requiring power, the selection apparatus being operative for isolating the output of at least one of the signal supply units from its respective feeder portion, the selection apparatus including switching means for alternatively connecting said unit requiring power to the first feeder portion, and for isolating said unit from the second feeder portion when in a first position, and for connecting said unit to the second feeder portion, and for isolating said unit from the first feeder portion when in a second position, the selection apparatus being operative for changing the position of the switching means automatically in response to one of a measurement of voltage at the feeder portions and a signal issued from at least one of the signal supply units;
   f) an enclosure in which the switching means is located; and
   g) at least one isolating transformer provided for electrical connection between the feeder portions and the switching means, the at least one isolating transformer being located outside the enclosure.

4. A trackside power distribution system, comprising:
   a) a first signal supply unit having an input for receiving power from a first electrical power source, and an output for supplying power;
   b) a first feeder portion connected to the output of the first signal supply unit and extending alongside a track to a unit requiring power;
   c) a second signal supply unit having an input for receiving power from a second electrical power source, and an output for supplying power;
   d) a second feeder portion connected to the output of the second signal supply unit and extending alongside the track to said unit requiring power; and
   e) a selection apparatus for selecting which feeder portion is used for supplying power to said unit requiring power, the selection apparatus being operative for selecting which feeder portion is used for supplying power to a load, and the selection apparatus further including a voltage slew rate limiter for limiting a rate of change of output voltage supplied to the load to below a threshold value.

5. The trackside power distribution system according to claim 4, in which at least one of the signal supply units includes means for producing a pilot signal, and a transmission means for sending the pilot signal along the respective feeder portion to the other signal supply unit, and in which the other signal supply unit includes a detection means for detecting the pilot signal supplied by the one signal supply unit and a load voltage applied to the respective feeder portion by the one signal supply unit.

6. The trackside power distribution system according to claim 5, in which both signal supply units include means for producing and for transmitting a pilot signal, and means for detecting the pilot signal and the load voltage from the other signal supply unit.

7. The trackside power distribution system according to claim 6, and further including a phase alignment means for maintaining the signals supplied to each feeder portion from the first and second signal supply units roughly in phase.

8. The trackside power distribution system according to claim 7, in which the phase alignment means comprises a measurement means for measuring a phase of the signal supplied by a first one of the signal supply units, and a correction means for adjusting a phase of the second one of the signal supply units to match that of the first signal supply unit.

9. The trackside power distribution system according to claim 7, in which each of the first and second signal supply units includes a phase alignment means.

10. A trackside power distribution system, comprising:
a) a first signal supply unit having an input for receiving power from a first electrical power source, and an output for supplying power;
b) a first feeder portion connected to the output of the first signal supply unit and extending alongside a track to a unit requiring power;
c) a second signal supply unit having an input for receiving power from a second electrical power source, and an output for supplying power;
d) a second feeder portion connected to the output of the second signal supply unit and extending alongside the track to said unit requiring power;
e) a selection apparatus for selecting which feeder portion is used for supplying power to said unit requiring power; and
f) at least one of the feeder portions comprising a cable comprising at least two discrete conductors, one of the conductors being arranged concentrically around the other of the conductors with an insulating sheath provided between the two cables.

11. A trackside power distribution system, comprising:
a) a first signal supply unit having an input for receiving power from a first electrical power source, and an output for supplying power;
b) a first feeder portion connected to the output of the first signal supply unit and extending alongside a track to a unit requiring power;
c) a second signal supply unit having an input for receiving power from a second electrical power source, and an output for supplying power;
d) a second feeder portion connected to the output of the second signal supply unit and extending alongside the track to said unit requiring power;
e) a selection apparatus for selecting which feeder portion is used for supplying power to said unit requiring power; and
f) at least one of the feeder portions decreasing in cross-sectional area along its length from an end nearest the respective signal supply unit to another end as a function of a current that the respective signal supply unit carries in operation.

12. A trackside radial power distribution system, comprising:
a) first and second electrical power sources;
b) at least one trackside unit requiring electrical power for its operation;
c) a first signal supply unit having an input for receiving power from the first electrical power source, and an output for supplying power;
d) a first feeder portion connected to the output of the first signal supply unit and extending alongside a track to the at least one trackside unit;
e) a second signal supply unit having an input for receiving power from the second electrical power source, and an output for supplying power;
f) a second feeder portion connected to the output of the second signal supply unit and extending alongside the track to the at least one trackside unit; and
g) a selection apparatus associated with the at least one trackside unit for selectively drawing power from either feeder portion to supply power to the at least one trackside unit.

13. The trackside radial power distribution system according to claim 12; in which the first and second electrical power sources comprise different electrical distribution networks.

14. The trackside radial power distribution system according to claim 12, in which the first feeder portion and the second feeder portion comprise portions of separate first and second feeders which extend from their respective signal supply units.

15. The trackside radial power distribution system according to claim 14, in which another trackside unit is located along the track, the trackside units each being connected to both the first and second feeders so that the first and second feeders at least partially overlap.

16. The trackside radial power distribution system according to claim 12, in which the first and second feeder portions comprise portions of a single feeder interconnecting the first and second signal supply units.

17. The trackside radial power distribution system according to claim 12, in which the track is divided into sections, and wherein the first and second signal supply units and the first and second feeder portions supply power along each section.

18. The trackside radial power distribution system according to claim 17, in which at least one of the signal supply units shares the first feeder portion between two sections of the track.

19. The trackside radial power distribution system according to claim 12, in which at least one of the signal supply units produces a 650 volt alternating output voltage.

20. The trackside radial power distribution system according to claim 12, in which the selection apparatus is operative for selecting which feeder portion is used for supplying power to a load.

21. The trackside radial power distribution system according to claim 20, in which the selection apparatus is provided for each of a plurality of loads.

22. The trackside radial power distribution system according to claim 12, in which the selection apparatus performs the selection automatically independent of human intervention.

23. The trackside radial power distribution system according to claim 12, in which the selection apparatus is operative for isolating the output of at least one of the signal supply units from its respective feeder portion.

24. The trackside radial power distribution system according to claim 12, in which the selection apparatus is located at the at least one trackside unit.

25. The trackside radial power distribution system according to claim 23, in which the selection apparatus includes switching means for alternatively connecting the at least one trackside unit to the first feeder portion, and for isolating the at least one trackside unit from the second feeder portion when in a first position, and for connecting the at least one trackside unit to the second feeder portion, and for isolating the at least one trackside unit from the first feeder portion when in a second position, the selection apparatus being operative for changing the position of the switching means automatically in response to one of a measurement of voltage at the feeder portions and a signal issued from at least one of the signal supply units.

* * * * *